Aug. 7, 1951     J. W. TISCORNIA ET AL     2,563,759
DISK BRAKE AND AUTOMATIC ADJUSTING MEANS THEREFOR
Filed Oct. 18, 1950     3 Sheets-Sheet 1
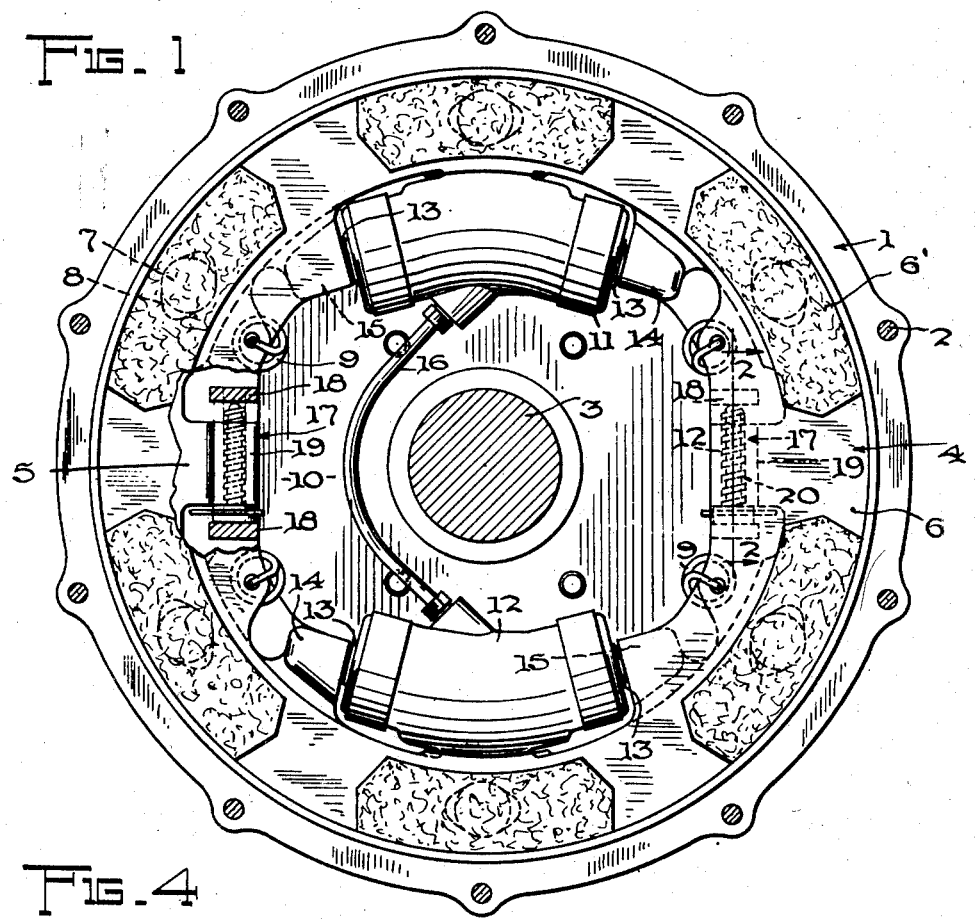
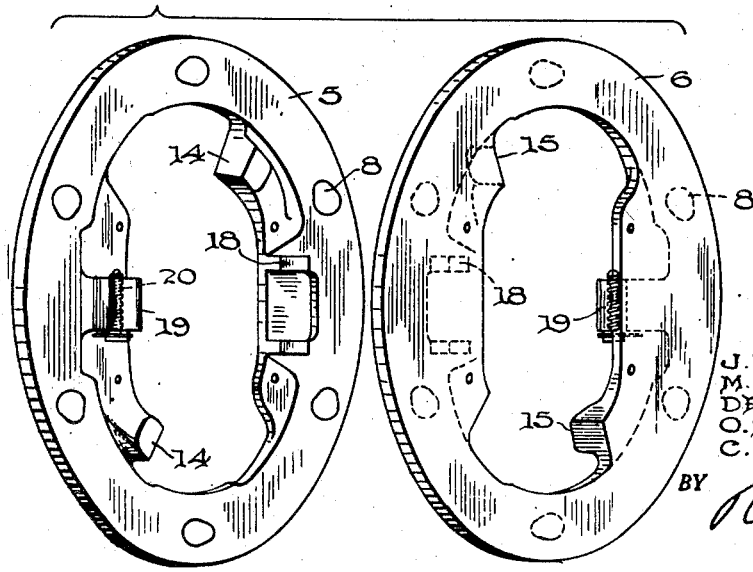
INVENTORS
J. W. TISCORNIA
M. B. LUCKER
DENT PARRETT
O. A. KERSHNER
C. R. MYERS
BY 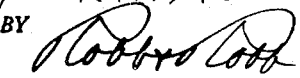
ATTORNEYS

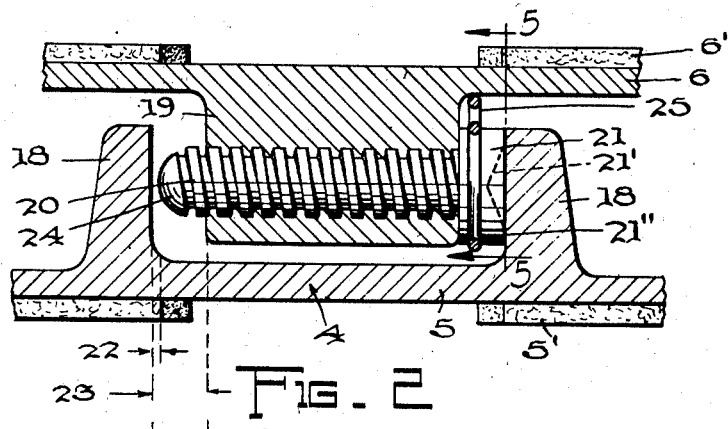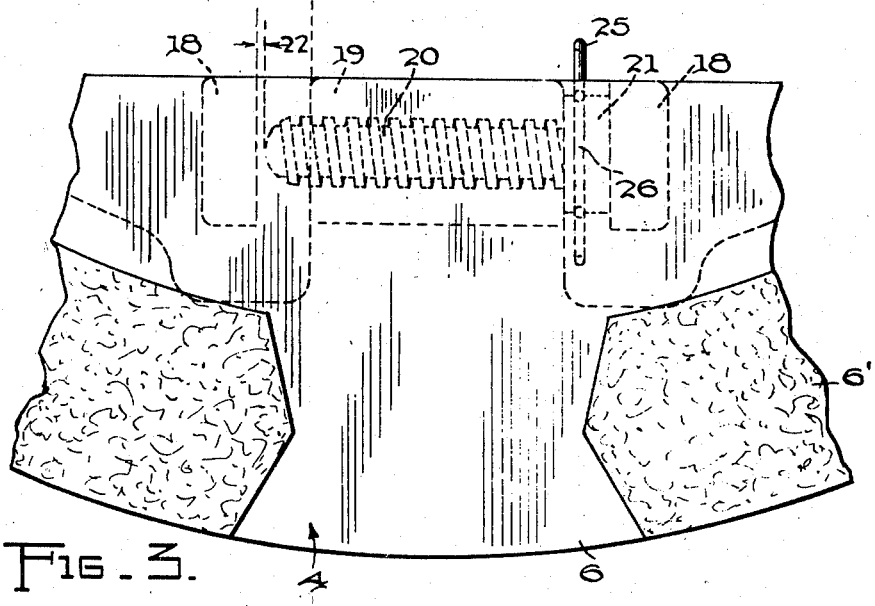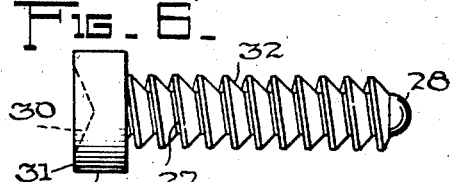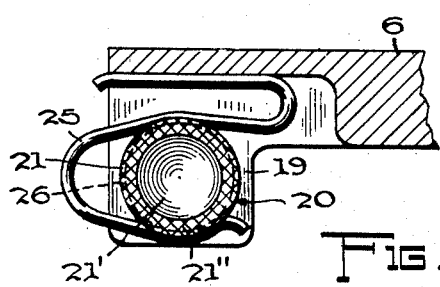

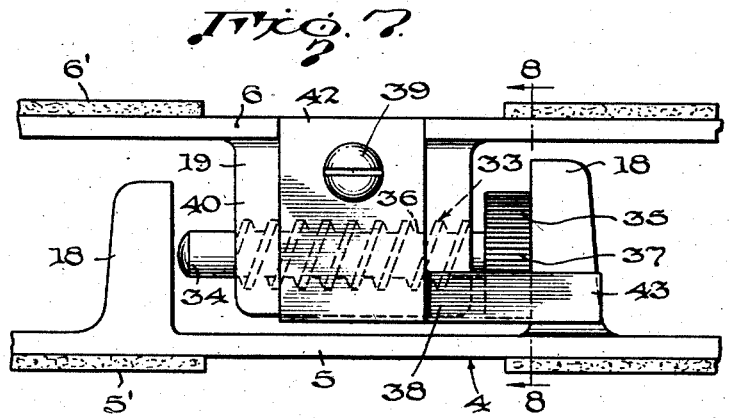
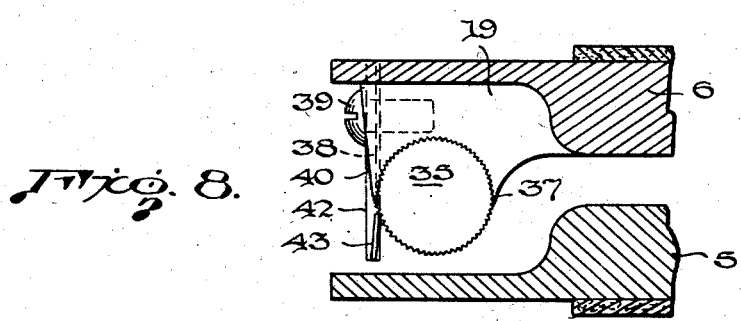
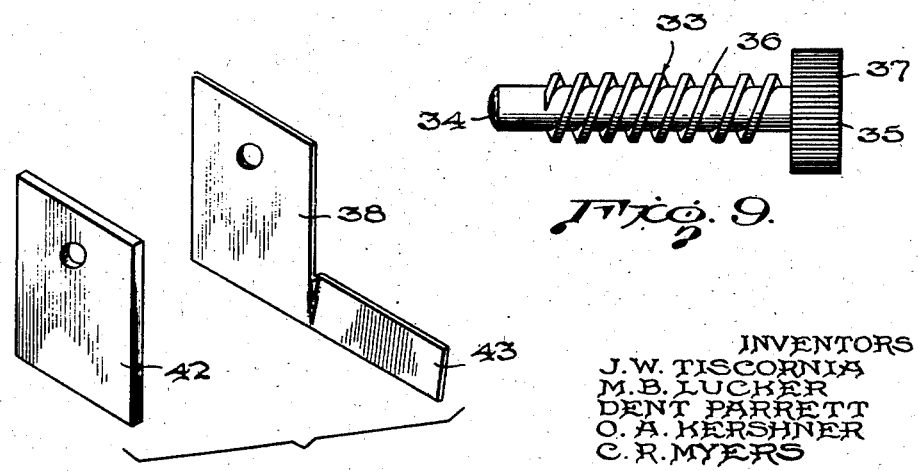

Patented Aug. 7, 1951

2,563,759

UNITED STATES PATENT OFFICE 2,563,759

DISK BRAKE AND AUTOMATIC ADJUSTING MEANS THEREFOR

James W. Tiscornia, Millard B. Lucker, Dent Parrett, and Osborn A. Kershner, St. Joseph, and Claude R. Myers, Galien, Mich., assignors, by mesne assignments, to Lambert Brake Corporation, St. Joseph, Mich., a corporation of Michigan Application October 18, 1950, Serial No. 190,684

24 Claims. (Cl. 188—72)

The present invention relates to improvements in brakes for automotive vehicles, or for any application involving a rotary member to be braked, and more particularly to an improved self-adjusting disc brake.

In its preferred embodiment, the invention more particularly concerns disc brakes of the type comprising an outer rotatable housing or casing having opposed friction surfaces on its inner sides, adapted to be connected to a rotary member to be braked, such as a motor vehicle wheel, for rotation therewith, and a relatively stationary double-disc assembly coaxially arranged within the housing and adapted for frictional engagement with the friction surfaces of the housing upon energization of the brake, the inner disc assembly including camming means, such as balls, interposed between the discs, for effecting axial separation of the discs upon slight relative rotary movements thereof and consequent frictional engagement of the inner discs with the housing, responsive to operation of suitable actuating instrumentalities, such as a conventional hydraulic brake system including one or more fluid-operated actuator cylinders or by a purely mechanical actuator mechanism, for effecting a highly efficient and extraordinarily powerful braking action which is far superior to that of any other known type of friction brake.

The wear of the friction surfaces of this type of brake is considerably less than that of conventional drum-and-shoe brakes, but some wear inevitably occurs in the course of time, thereby cutting down the efficiency of the brake, with resultant lowering of the foot pedal generally used for controlling the operation of the brake, and thereby allowing excessive and increasing free movement of the brake pedal, until the brake ultimately becomes inoperative.

To obviate these difficulties, adjustment means may be provided to compensate for such wear, said adjusting means being either manually adjusted from time to time as may be found necessary to maintain proper running clearance between the friction surfaces, and accordingly the proper effective foot pedal position, or being of the automatically operable type as more particularly disclosed in the prior co-pending applications, Serial No. 55,178, filed October 18, 1948 (now Patent No. 2,526,149, dated October 17, 1950), and Serial No. 116,582, filed September 19, 1949.

The present invention is more particularly concerned with automatic or self-adjusting brakes, and with adjusting means that constitute an improvement over the adjusting mechanisms of the aforementioned applications.

The primary objects of this invention are to provide a friction brake of the self-adjusting double-disc type and of simplified construction and assembly, the parts being interchangeable, and being more simply and easily serviced or repaired.

A further object is to provide an automatic self-adjusting friction brake having a more accurate and positive automatic brake adjustment than has been possible heretofore.

Another object of the invention is to provide an automatic self-adjusting friction brake having means for limiting the extent of progressive adjustment of the friction members relative to each other, whereby to prevent any damage to the friction surfaces which would otherwise occur through excessive wear of the friction surfaces unless over-adjustment is prevented.

A still further object is to provide an automatic brake adjuster adapted to prevent over-adjustment during progressive compensation for wear of the friction lining and attendant loss of running clearance between the friction surfaces, thereby eliminating any possibility of a dragging brake.

Another object of the invention is to provide means for holding the self-adjusting brake assembly in adjusted position, thereby effecting positive adjustment, with no possibility of retro-adjustment, which would otherwise cause excessive clearance between the friction surfaces and attendant excessive free play or movement of the foot-controlled actuating pedal.

In carrying out the invention, an automatically operable, one-way locking screw adjuster is utilized, which permits progressively greater relative rotation in one direction of the complementary discs of the inner double-disc assembly sufficient to compensate for progressive wear and to thereby insure effective braking action between the friction members regardless of the degree of wear of the friction surfaces, while positively preventing rotation of the discs in the opposite direction past a predetermined point when the brake is released so as to provide and maintain a constant predetermined running clearance between the friction surfaces.

Other and further objects and advantages of the invention will be hereinafter described and the novel features thereof defined in the appended claims.

In the drawings:

Figure 1 is a view, partly in section and partly in elevation, showing a double-disc brake constructed in accordance with the present invention and as more particularly applicable to automotive vehicles, the outboard side of the rotary housing being removed to expose the interior of the brake assembly, and said brake embodying opposed automatic adjusters of improved form according to the present invention;

Figure 2 is an enlarged fragmentary view in vertical section as taken on the line 2—2 of Figure 1, through the inner double-disc assembly and one of the adjusters;

Figure 3 is an enlarged fragmentary view in side elevation of that portion of the brake assembly embodying the adjuster means at the side of the brake diametrically opposite to Figure 2;

Figure 4 is a reduced exploded perspective view of the two identical complementary discs of the inner double-disc assembly, showing the relation of the lugs and the adjusters on the respective discs, when the discs are arranged back-to-back as in the brake assembly, the friction linings on the discs being omitted from this view;

Figure 5 is a fragmentary detail view, partly in elevation and partly in section, as taken on the line 5—5 of Figure 2, showing the knurled or serrated head on the adjusting screw which in this embodiment prevents reverse rotation of the screw when the brake is released and when the brake is applied during rotation of the housing, and also showing the clip spring which is adapted to prevent over-adjustment of the brake;

Figure 6 is a view in side elevation of a modified form of adjuster screw, this adjuster screw having threads of the buttress type;

Figure 7 is an enlarged fragmentary view in elevation of still another embodiment of a screw-adjuster made in accordance with the invention as seen when looking radially outward at the inner side of the inner double-disc assembly in the area of one of the adjusters;

Figure 8 is a sectional view taken on the line 8—8 of Figure 7;

Figure 9 is a view in side elevation of the modified adjuster screw shown in Figures 7 and 8; and Figure 10 is an exploded detail view in perspective of the locking spring and the clamping plate therefor which cooperates with the head of the adjuster screw of Figures 7 to 9.

Like reference characters designate corresponding parts in the several figures of the drawings, and it will be understood that although the invention is represented in an embodiment which is more particularly applicable to automotive vehicles, it is not confined thereto, but may be availed of in any instance where a rotary member is to be braked.

Referring to Figure 1, I generally denotes the inboard section of a two-part housing or casing, the two sections of the housing being suitably secured together by bolts 2 extending through abutting marginal flanges on each section of the housing. The housing I is adapted to be attached to a wheel mounting hub of a vehicle wheel for rotation therewith as is customary with brakes of this type. The wheel together with the brake housing or casing is mounted on an axle or spindle 3 of the motor vehicle.

When assembled, the inner faces of the housing constitute two axially spaced opposed friction surfaces of annular form adapted for cooperation with an inner double-disc assembly, generally denoted 4. This double-disc assembly preferably comprises a pair of identical discs, designated respectively 5 and 6, arranged back-to-back, with a plurality of balls 7 disposed therebetween and seating in oppositely disposed and oppositely inclined seats 8 formed in the inner faces of the discs 5 and 6. A plurality of tension springs 9 connect the two discs 5 and 6 together, thereby holding the balls therebetween, the force of the springs 9 causing the discs to assume a normal position with the balls 7 seating in the deepest part of the ramped seats 8. Thus, it is seen that the discs 5 and 6, held together by the springs 9, form a unitary double-disc assembly.

As is customary in this type of brake, the outer faces of these discs 5 and 6 are preferably provided with segments or facings of friction lining material, as indicated at 5' and 6' respectively, this lining being bonded or otherwise suitably attached to the discs in opposed relation to the friction surfaces of the housing I.

As is best seen in Figure 4 of the drawings, the discs 5 and 6 of the inner double-disc assembly 4 are preferably identical, and therefore, they may be readily interchanged. Moreover, by virtue of being identical parts, it is only necessary to cast one form of disc and accordingly it is only necessary for jobbers or mechanics to stock a single form of disc, since each disc may be utilized as either an inboard or outboard disc in each assembly or in either the front or rear, right- or left-hand brake assemblies in the case of motor vehicles.

At the inboard side of the brake is a backing or adapter plate 10 which may be suitably and rigidly secured to the wheel mounting. Fixedly mounted at diametrically opposite points on this plate 10 is a pair of actuators, designated respectively 11 and 12, which control the energization and release of the brake. The actuators 11 and 12 are, in the illustrative embodiment represented in the drawings, of the fluid-operated, double-acting cylinder type from which are extended fluid-operated pistons 13 at each end of each cylinder.

The inner double-disc assembly 4 is adapted to freely float coaxially within the housing 1, with the inner disc assembly 4 remaining relatively stationary while the housing I rotates with the wheel of the vehicle. By means of diametrically opposed lugs or bosses 14, 14 on the disc 5 and a pair of corresponding lugs or bosses 15, 15 on the disc 6, the discs 5 and 6 are actuated by the projecting ends of the pistons 13. On admission of fluid under pressure into the actuators 11 and 12, which are interconnected by a line or tube 16, the pistons 13 in each of the cylinders cause relative rotation of the two discs 5 and 6 of the inner disc assembly 4, with resultant axial separation of the discs by virtue of the balls 7 riding up the ramps of the seats 8 between which the balls are located, with a camming action, thereby forcing the inner discs into frictional engagement with the friction surfaces of the housing I, with a powerful braking effect. This braking effect is accelerated by the motion of the vehicle, resulting in what is commonly referred to as a servo action. Upon release of fluid pressure in the actuators 11 and 12, the springs 9 pull the discs 5 and 6 axially towards each other, causing relative rotation of the discs 5 and 6 in the opposite direction to their movement during brake application as the balls 7 roll down the ramps to the deepest portion of the ball seats 8. Thus, when the brake is released, the discs 5 and 6 disengage the rotary housing I and remain out of engagement until the brake is re-applied.

The friction linings 5' and 6' with which brakes of the herein described type are usually provided, wear down over a prolonged period of use, and as this progressive wear occurs, the effective position of the usual brake pedal will get progressively lower. It is necessary, therefore, to overcome this loss of pedal due to the fact that the extra time consumed in pushing the brake pedal to its effective position is a hazard in the event it is necessary to apply the brake quickly, as is often the case.

Automatic means for overcoming and obviating this difficulty have been disclosed in the hereinbefore referred to pending applications, in which the brakes are provided with automatic adjusting means which progressively compensate for the progressive wear of the friction lining material, with attendant maintenance of a substantially constant effective brake pedal position, and simultaneously maintaining a substantially constant release or running clearance between the friction surfaces when the brake is released. The automatic self-adjusting means of the present invention constitutes a substantial improvement in the accuracy and positiveness of these automatic brake adjusters, and will now be particularly described.

With reference to Figure 1 of the drawings, it is seen that each brake is provided with a pair of diametrically opposed adjusting devices denoted generally at 17, these adjusting devices being located and confined between the discs 5 and 6. Each adjuster device includes a pair of spaced, laterally extended integral lugs 18, 18 on one of the discs of the inner double-disc assembly 4, the opposed portion of the other of said discs being provided with a single laterally extended lug 19 integral therewith and of a size to be received within the confines of the lugs 18, 18 when the discs are assembled in back-to-back relationship, as best seen in Figure 2. Each of the lugs 19 is provided with a longitudinally extended screw-threaded opening to accommodate an adjusting screw 20 having an enlarged head 21. The central portion of the screw-head 21 is recessed or countersunk as at 21', leaving an annular, flat, lug-engaging surface 21'' at the outer margin of the extreme end of the screw-head, this surface 21'' being suitably knurled, serrated or otherwise roughened for increasing the frictional contact between the surface 21'' and the contiguous face of the lug 18, as will be hereinafter more fully described. (See Figure 5.) The overall length of the screw 20 is slightly less than the distance between the opposed faces of the lugs 18, 18, this difference governing the release or running clearance of the brake. The lugs 18, 18 and the lug 19 are so constructed that the maximum total of the progressive adjustment of the brake is limited by the clearance 23 between the left side of the lug 19 and inner side of the left lug 18, as seen in Figure 2.

The screw 20 has a rounded lead end, as at 24, and preferably has a double lead thread of approximately 8 pitch, as in the embodiment shown in Figures 1 through 5. It is to be understood that the screw is not limited to this specific form, however, and may have threads of a different type and the thread may be of some other pitch, but it has been found through actual tests that a screw having a thread angle in the neighborhood of 45° is very satisfactory.

In one form of the invention a clip spring 25 is carried by the head of the screw 20 to prevent over-running of the screw due to its inertia during adjustment of the brake, with consequent over-adjustment thereof which would cut down on the required release or running clearance, and may even cause the brake to drag when it is released. The resilient clip spring 25 is seated in an annular groove 26 about the periphery of the screw head 21, and the free end thereof engages the adjacent portion of its respective disc 5 or 6 of the inner double-disc assembly.

The operation of the brake and its automatic self-adjuster will now be described, as applied to a motor vehicle having the ordinary hydraulic brake system comprising a brake pedal, a master cylinder and fluid conducting lines to the brake mechanism on the wheels of the vehicle.

Upon application of the brakes by the operator of the vehicle, fluid under pressure is transmitted through the conducting lines to the actuator cylinders 11 and 12 in each of the brake assemblies, forcing the pistons 13 of the respective cylinders on which the inner double-disc assembly is freely floating by the lugs 14 and 15, on the respective discs, outwardly and causing relative rotation of the inner discs 5 and 6 and consequent axial separation thereof against the tension of the springs 9 due to the balls 7, which are interposed between the discs, riding up the ramps of their respective seats 8, until the friction linings 5' and 6' come into engagement with the opposed friction surfaces of the housing 1. As the outboard disc 6, as viewed in Figure 2, moves to the left relative to the disc 5, the lug 19 moves, together with the screw 20 therethrough, until the braking surfaces are frictionally engaged, and as the linings 5' and 6' progressively wear, the lead end 24 of the screw 20 is forced against the adjacent lug 18, forcing the screw to turn back out of the lug 19 for a distance corresponding to the degree of wear of said linings 5' and 6'. The screw 20 is forced rearwardly with a substantial force and would have a tendency to over-run and consequently over-adjust the brake. Therefore, the head 21 of the screw 20 may be provided with a clip spring 25 which frictionally retards the screw against over-running, thereby assuring accurate adjustment of the brake only to the extent of lining wear, plus the difference between the overall length of the screw 20 and the opposed faces of the lugs 18, which difference determines the release or running clearance when the brakes are released.

When the brakes are released, and there is no longer any substantial pressure in the cylinders 11 and 12, the springs 9 pull the inner discs axially towards each other and the balls 7 ride down the ramps of the seats 8 to the deepest part thereof, the lugs 14 and 15 forcing the respective pistons back into the cylinders 11 and 12 with consequent relative rotative movement of the discs 5 and 6 in the reverse direction from that when the brake was applied, until the lugs 18 adjacent the heads 21 of the screws 20 abut thereagainst. Now it is apparent that the screws 20 have been moved longitudinally in the direction of their headed ends a distance corresponding to the degree of lining wear, and therefore the discs 5 and 6 do not move back to their precise original position, but the heads of the screws 20 abutting against the lugs 18 hold the discs in this adjusted position.

The knurled or serrated annular surface 21'' on the extreme end of the head 21 of each screw 20 creates a dragging action between its face and the abutting lug 18, thereby preventing reverse rotation of the screw as a result of the lug 18 striking the screw head 21 upon release of the brake, and this dragging action also prevents the screw 20 from being pushed into the lug 19 due to the tension of the springs 9.

The recess or countersink 21' in the extreme end of the screw head 21 assures that there will be frictional contact at the maximum radius of the head 21 and the adjacent lug 18. Thus, the automatic adjustment of the brake assembly is positively assured.

This self-adjusting action as above described is duplicated by the identical adjuster unit provided at a diametrically opposite position in the brake assembly to that illustrated by Figures 2 and 3.

The principle of the adjusting screw action may be explained in the following manner:

The force required to move the screw 20 through the tapped hole in lug 19 is represented by the formula P=FCR, where F is the force in pounds acting at radius R; R is the radius of the point of contact of the lug 18 at the lead end 24 of the screw relative to the center line of the screw; and C is the coefficient of friction of the metal of the screw and the lug in contact. F and C are constants. Therefore, the force required to move the screw is dependent upon R.

The force required at the rounded lead end 24 of the screw is small because R is small. Conversely, the force to move the screw at the large headed end 21 is large because R is large. This results in an adjusting screw with relative free movement in one direction and locking action in the opposed direction.

In Figure 6 is shown a modified form of adjuster screw 27 which may be utilized in lieu of the screw 20 shown in Figures 1 through 5. This screw has a rounded lead end 28 and a head 29 provided with a countersink 30 and a roughened annular friction surface 31, just as the adjuster screw 20. But, however, the thread instead of being of a standard type is a buttress thread, as at 32, which is characterized by being easily shiftable through a correspondingly threaded opening in the lug 19 of each adjuster device of the inner double-disc assembly 4, but offering substantial resistance to shifting of the screw 27 in the opposite direction, by virtue of one face of the thread 32 being inclined while the other face of said thread is substantially perpendicular to the axis of the screw 27. Accordingly, because of the inherent resistance of the screw 27 to over-running during application of the brake and consequent shifting movement of the screw 27 in one direction through the lug 19, it is not necessary to use clip spring 25 on this type of screw, but it may optionally be used if desired or required under certain special conditions.

In Figures 7 through 10 is shown a further modification of the screw adjusting means 4 which may be utilized in lieu of the screws 20 or 27 shown in Figures 1 through 5, and Figure 6 respectively. In this further modified form of screw adjuster, the construction of the discs 5 and 6 and the relative positions of the lugs 18 and the lug 19, respectively, thereon is the same as that of the construction shown in Figures 1 through 5, but a modified form of adjuster screw 33 is utilized, having a rounded lead end 34 and an enlarged head 35.

In the illustrative embodiment, the screw 33 is provided with threads 36 of the double lead square type, but obviously, if desired, the threads may be of the buttress type as shown in Figure 6, or otherwise. The enlarged head 35 of the screw 33 is provided about its peripheral face with longitudinally extended serrations or teeth 37, cooperative with a spring 38 for effecting a positive means for preventing rotation of the screw 33 in one direction, as will hereinafter become apparent.

Suitably fastened, as by means of a screw or the like 39, to the inner side 40 of the lug 19, is the spring member 38, which is preferably rigidly positioned by means of a clamping plate 42 adapted to clamp the spring 38 against the side face 40 of the lug 19. The spring 38 is provided with a laterally offset extension 43, which is adapted to extend longitudinally of the screw into overlying relationship with the enlarged head 35 thereon. The lateral extension 43 of the spring 38 is formed at a slight angle with respect to the main body of the spring, as best seen in Figures 8 and 10, thereby engaging the serrations or teeth 37 on the head 35 of the screw, in the manner of a spring pawl, at one of its sides.

The operation of this embodiment of the invention is the same as that of the other illustrative embodiments, except that when the brake is applied and the screw 33 is caused to back out of the lug 19 responsive to engagement with one of the lugs 18, as lining wear progressively occurs, the pawl portion 43 of the spring 38 will ride over the serrations or teeth 37 on the screw head 35, but when the brake is released and the opposite lug 18 engages the headed end of the screw 33, tending to force said screw in the opposite direction through the lug 19, the spring pawl 43 positively engages the serrations 37 and prevents rotation, thereby effecting a positive lock against loss of running or release clearance, and consequent brake drag due to reverse rotation of the screw.

The serrations or teeth 37 on the screw head 35 are preferably relatively fine and closely spaced, so that rotation of the screw through an angle corresponding to one tooth or to the distance between adjacent notches of two successive teeth will effect a brake adjustment or compensation equal to approximately .0025" of lining wear in the case of those applications of the invention for motor vehicle brakes. It is to be understood, however, that this degree of adjustment per tooth can be varied as desired, and the serrations or teeth on the screw head may be made more or less fine, if preferred.

It will be recognized from the foregoing that the self-adjusting disc brake assembly of this invention is a substantial improvement over those of the co-pending applications hereinbefore referred to, in that it is more simply assembled and provides a more accurate and positive automatic brake adjustment than has been attainable heretofore.

While the specific details have been herein shown and described, the invention is not confined thereto as changes and alterations may be made without departing from the spirit thereof as defined in the appended claims.

We claim:

1. A friction brake, comprising a rotary member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting movement of one disc relative to the other, and screw adjuster means including co-operatively inter-engaged screw-threaded members carried by one of said discs and abutment means carried by the other disc and engageable by one of said screw-threaded members for automatically adjusting said discs relative to the friction surfaces of said rotary member responsive to braking applications to progressively compensate for wear and for maintaining a substantially constant release clearance of said discs relative to said rotary member when the brake is released.

2. A friction brake as defined in claim 1, wherein said screw adjuster means comprises an adjuster screw supported by one disc of said double-disc assembly and shiftable endwise in one direction responsive to application of the brake, spaced abutment means carried by the other disc of said double-disc assembly and laterally extended therefrom across the extreme opposite ends of said screw for abutting engagement therewith, and said adjuster screw and abutment means being so constructed and arranged as to permit shifting movement of said screw in one direction while prohibiting movement of said screw in the opposite direction responsive to application and release, respectively, of said brake.

3. A friction brake as defined in claim 1, wherein said screw adjuster means comprises an adjuster screw supported by one disc of the double-disc assembly and shiftable endwise in one direction responsive to application of said brake, spaced abutment means carried by the other disc of said double-disc assembly and laterally extended therefrom across the extreme opposite ends of said screw for abutting engagement therewith, the distance between the spaced abutment means being slightly greater than the length of said screw, and said adjuster screw and abutment means being so constructed and arranged as to permit shifting movement of said screw in one direction while prohibiting movement of said screw in the opposite direction responsive to the application and release, respectively, of said brake.

4. A friction brake as defined in claim 1, wherein said screw adjuster means comprises an adjuster screw rotatably and threadedly mounted for endwise adjustment in a lug carried by one of said discs of the double-disc assembly, said lug being laterally extended towards the other of said discs, a pair of spaced lugs carried by the other disc of said double-disc assembly and laterally extended therefrom towards the first-mentioned disc at the extreme opposite ends of said screw for abutting engagement therewith, and said adjuster screw and lugs being so constructed and arranged as to permit rotation of said screw in one direction while prohibiting rotation of said screw in the opposite direction responsive to application and release, respectively, of said brake.

5. A friction brake as defined in claim 1, wherein said screw adjuster means comprises a headed adjuster screw rotatably and threadedly mounted for endwise adjustment in a lug carried by one of said discs of the double-disc assembly, a pair of lugs carried by the other of said discs of the double-disc assembly and disposed at the extreme opposite ends of the screw aforesaid for abutting engagement therewith, and means between the head portion of said screw and the contiguous portion of its engaging lug aforesaid including a roughened face on one of said portions for prohibiting rotation of said screw in one direction responsive to release of said brake.

6. A friction brake as defined in claim 1, wherein said screw adjuster means includes means for preventing over-adjustment of said brake due to over-running of said screw adjuster responsive to application of the brake.

7. A friction brake as defined in claim 1, wherein said screw adjuster means includes a spring frictionally engaging said screw for preventing over-adjustment of said brake due to over-running of said screw adjuster responsive to application of the brake.

8. A friction brake as defined in claim 1, wherein said screw adjuster means includes means for limiting further adjustment of said discs relative to the friction surfaces of the rotary member when a predetermined total of progressive wear of the friction surface has occurred.

9. A friction brake as defined in claim 1, wherein said screw adjuster means includes an adjuster screw having threads thereon of the buttress type.

10. A friction brake as defined in claim 1, wherein said screw adjuster means includes a lug on one of the discs of the double-disc assembly and a pair of circumferentially spaced lugs on the other of said discs of the double-disc assembly, disposed on opposite sides of the first-mentioned lug, said lug on the one disc being engageable with one of the lugs on the other disc to limit further adjustment of said discs relative to the friction surfaces of the rotary member when a predetermined total of progressive wear of the friction surfaces has occurred.

11. A friction brake, comprising a rotary member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting movement of one disc relative to the other, and screw adjuster means carried by said discs at diametrically opposite positions with respect to said double-disc assembly and wholly confined between said discs, for automatically adjusting said discs relative to the friction surfaces of said rotary member responsive to braking applications to progressively compensate for wear and for maintaining a substantially constant release clearance of said discs relative to said rotary member when the brake is released.

12. A friction device for brakes and the like, comprising a pair of coaxially arranged discs movable both rotatively and axially relative to each other, camming means between said discs for axially separating said discs responsive to rotation of one disc relative to the other, yieldable means interconnecting said discs for normally urging the same towards each other, said discs being identical with each other and each of said discs being provided with a laterally projecting lug extending from one face thereof, and provided with a pair of circumferentially spaced lugs laterally extended from the same face thereof and disposed in a diametrically opposite position to the first-mentioned lug, so that when the discs are assembled back-to-back with the lug on one disc opposed to the spaced lugs on the other disc, the lug on one disc will lie between the spaced lugs on the other disc and spaced therefrom, an adjuster screw threadedly mounted in the first-mentioned lug of each disc and shiftable endwise therein responsive to rotation thereof, with the extreme ends of said screw lying between the adjacent spaced lugs on the other disc for abutting engagement therewith, and each of said adjuster screws having a greater radius at one end than at the other for causing rotation of said screws in one direction responsive to rotative movement of one disc relative to the other in a direction causing the camming means to axially separate the discs, while prohibiting rotation of said screws in the opposite direction responsive to rotative movement of one disc relative to the other in the opposite direction.

13. A friction device as defined in claim 12, wherein the large radius ends of the screws are provided with a roughened face for creating increased frictional drag between the adjuster screws and the abutting face of one of the lugs on the opposed disc.

14. A friction device as defined in claim 12, wherein each adjuster screw is provided with means for preventing over-running of said screws upon rotation thereof.

15. A friction device as defined in claim 12, wherein each adjuster screw is provided with an enlarged headed end.

16. A friction device as defined in claim 12, wherein the overall length of the adjuster screw is slightly less than the distance between the circumferentially spaced lugs on the other disc to allow slight relative rotation of said discs in the opposite direction.

17. A friction device as defined in claim 12, wherein one side of the first-mentioned lug on each of said discs is engageable with one of the circumferentially spaced lugs on the other of said discs to limit relative rotation of the discs in one direction when the adjuster screws assume the limit of their adjustment in one direction.

18. A friction device as defined in claim 12, wherein said adjuster screws are provided with threads of the buttress type.

19. A self-adjuster for brakes having cooperative friction elements movable towards and away from each other for braking engagement and release thereof, comprising a pair of stationary spaced abutments adapted to be carried by one of said friction elements, a relatively movable lug adapted to be carried by the cooperative friction element and disposed between said spaced abutments and spaced therefrom, said lug being provided with a threaded opening, and a screw extending through said opening for abutting engagement with the abutments aforesaid, for effecting rotation and consequent endwise shifting of said screw in said lug, one end of said screw having a relatively small radius and the opposite end thereof having a relatively large radius for limiting said screw to rotation in one direction only responsive to pressure of the spaced abutments against opposite ends of said screw.

20. A self-adjuster for brakes as defined in claim 19, wherein said screw is provided with threads of the buttress type, and the threaded opening in said lug has complemental screw threads therein.

21. A friction brake, comprising a rotary member having opposed axially spaced friction surfaces, a relatively stationary double-disc assembly coaxially arranged between the opposed friction surfaces of the rotary member aforesaid for frictional engagement therewith, said double-disc assembly including camming means between said discs for causing engagement of said discs with the friction surfaces of said rotary member responsive to slight rotative movement of one disc relative to the other, actuator means for effecting movement of one disc relative to the other, and screw adjuster means carried by said discs for automatically adjusting said discs relative to the friction surfaces of said rotary member responsive to braking applications to progressively compensate for wear and for maintaining a substantially constant release clearance of said discs relative to said rotary member when the brake is released, said screw adjuster means comprising an adjuster screw supported by one disc of said double-disc assembly and shiftable endwise in one direction responsive to application of the brake, spaced abutment means carried by the other disc of said double-disc assembly and laterally extended therefrom across the extreme opposite ends of said screw for abutting engagement therewith, and said adjuster screw being provided with an enlarged head on one end having serrations circumferentially spaced about the periphery thereof, and means cooperative with said serrations for permitting shifting movement of said screw in one direction while prohibiting movement of said screw in the opposite direction responsive to application and release, respectively, of said brake.

22. A friction brake as defined in claim 21, wherein said last-mentioned means comprises a spring pawl.

23. A friction brake as defined in claim 21, wherein said last-mentioned means comprises a leaf spring having a laterally offset extension overlying the enlarged head of the adjuster screw, and said laterally offset extension being inclined towards said screw head for selective engagement with the serrations on the periphery thereof.

24. A friction brake as defined in claim 21, wherein said last-mentioned means comprises a leaf spring carried by the disc which carries the adjuster screw, a clamping plate operatively engaging said leaf spring for clamping the same to the disc aforesaid, and said leaf spring having a yieldable portion disposed for cooperative engagement with the serrations on the head of the adjuster screw.

JAMES W. TISCORNIA.
MILLARD B. LUCKER.
DENT PARRETT.
OSBORN A. KERSHNER.
CLAUDE R. MYERS.

REFERENCES CITED

The following references are of record in the file of this patent:

UNITED STATES PATENTS

| Number | Name | Date |
| --- | --- | --- |
| 1,875,065 | Lyman | Aug. 30, 1932 |
| 2,175,446 | Rasmussen | Oct. 10, 1939 |
| 2,291,662 | Thibeault | Aug. 4, 1942 |
| 2,526,149 | Myers | Oct. 17, 1950 |